United States Patent [19]
Nishii et al.

[11] Patent Number: 5,927,074
[45] Date of Patent: Jul. 27, 1999

[54] HYDRAULIC BRAKE APPARATUS FOR A VEHICLE

[75] Inventors: Michiharu Nishii, Toyota; Satoshi Ishida, Chiryu; Masahiko Kato, Toyoake, all of Japan

[73] Assignees: Aisin Seiki Kabushiki Kaisha; Toyota Jidosha Kabushiki Kaisha, both of Kariya, Japan

[21] Appl. No.: 08/865,106

[22] Filed: May 29, 1997

[30] Foreign Application Priority Data

May 31, 1996 [JP] Japan ................................ 8-160847

[51] Int. Cl.⁶ ............................................................ F16B 7/00
[52] U.S. Cl. .................................. 60/591; 60/592; 303/11
[58] Field of Search .............................. 60/561, 562, 583, 60/585, 589, 591, 592, 594; 303/10, 11

[56] References Cited

U.S. PATENT DOCUMENTS

| | | | |
|---|---|---|---|
| 4,078,384 | 3/1978 | Shutt ......................................... | 60/562 |
| 4,170,386 | 10/1979 | Shutt ......................................... | 60/562 |
| 4,745,750 | 5/1988 | Belart et al. ............................. | 60/547.1 |
| 4,753,069 | 6/1988 | Seibert et al. ............................ | 60/591 |
| 5,005,350 | 4/1991 | Reinartz et al. ......................... | 60/562 |
| 5,018,353 | 5/1991 | Pugh ......................................... | 60/562 |
| 5,081,841 | 1/1992 | Nishii ....................................... | 60/591 |
| 5,515,678 | 5/1996 | Kurokawa et al. . | |
| 5,733,017 | 3/1998 | Nakashira et al. ....................... | 303/11 |

FOREIGN PATENT DOCUMENTS 7-172291  7/1995  Japan .
711129    6/1954  United Kingdom .
1456206  11/1976  United Kingdom .

*Primary Examiner*—Chris Schwartz
*Attorney, Agent, or Firm*—Burns, Doane, Swecker & Mathis, LLP

[57] ABSTRACT

The invention is directed to a hydraulic brake apparatus which includes a master cylinder having a cylinder body and a master piston slidably disposed therein for defining a pressure chamber ahead of the master cylinder and a power chamber behind the master piston. A control piston is slidably disposed in the cylinder body ahead of the master piston to define the pressure chamber behind the control piston, and adapted to be moved in response to movement of the master piston. An auxiliary pressure source is provided for pressurizing brake fluid to generate a power pressure. A valve assembly having a regulator chamber defined ahead of the control piston is communicated with the auxiliary pressure source to regulate the power pressure into a regulated pressure in response to movement of the control piston, and adapted to supply the regulated pressure into the power chamber to assist the operation of the manually operated member. The valve assembly includes a valve seat disposed ahead of the control piston, and a control valve disposed ahead of the valve seat. An adjusting device is disposed ahead of the control valve, and engaged with a front end of the control valve to urge the control valve to be seated on the valve seat when the regulated pressure exceeds a predetermined pressure. And, a space defined between the adjusting device and the front end of the control valve is communicated with the reservoir.

7 Claims, 4 Drawing Sheets

5,927,074

HYDRAULIC BRAKE APPARATUS FOR A VEHICLE

BACKGROUND OF THE INVENTION

1. Field of the Invention

The present invention relates to a hydraulic brake apparatus for a vehicle, and more particularly to the apparatus having an auxiliary pressure source for generating a brake pressure and a valve assembly for regulating the brake pressure.

2. Description of the Related Arts

A hydraulic brake apparatus having an auxiliary pressure source as disclosed in the U.S. Pat. No. 5,515,678 is adapted to provide a brake pressure generating device which can alter a characteristic of a pressure in a pressure chamber relative to a brake pedal operating force. This brake pressure generating device includes a cylinder body, a pressure source connected with the cylinder body for generating a pressure, a piston slidably disposed in the cylinder body for being operated by a brake pedal of the vehicle, a spool valve slidably disposed in the cylinder body for forming a pressure chamber with the piston at one end thereof and for regulating the pressure of the pressure source, and restriction means which receives a regulated pressure from the spool valve at one end thereof and connected with the other end of the spool valve at the other end thereof for varying a characteristic of a relation between a pressure in the pressure chamber and the regulated pressure.

In the above-described brake apparatus, by changing the outer diameter of the piston slidably received in the sleeve, and the outer diameter of the restriction means connected with the spool valve, it is possible to alter the regulated pressure in accordance with the pressure generated in the pressure chamber. According to the above-described brake apparatus, however, the spool is arranged to receive every force to be regulated. Therefore, it is necessary to make the spool by high-intensity material. This will be a great bar, when the apparatus is to be made small, and its manufacturing cost will be raised.

SUMMARY OF THE INVENTION

Accordingly, it is an object of the present invention to provide a hydraulic brake apparatus for a vehicle having an auxiliary pressure source and a valve assembly, which is adapted to minimize a force applied to a control valve in the valve assembly, and which is easily designed at a low cost.

In accomplishing the above and other objects, a hydraulic brake apparatus for a vehicle includes a master cylinder having a cylinder body and a master piston slidably disposed therein for defining a pressure chamber ahead of the master cylinder and a power chamber behind the master piston. The master piston is adapted to be moved forward in response to operation of a manually operated member, e.g., a brake pedal, to pressurize brake fluid stored in a reservoir and generate a brake pressure from the pressure chamber. A control piston is slidably disposed in the cylinder body ahead of the master piston for defining the pressure chamber behind the control piston. The control piston is adapted to be moved in response to movement of the master piston. An auxiliary pressure source is provided for pressurizing the brake fluid to generate a power pressure. A valve assembly having a regulator chamber defined ahead of the control piston is communicated with the auxiliary pressure source to introduce the power pressure into the regulator chamber, and regulate the power pressure into a regulated pressure in response to movement of the control piston. The valve assembly includes a valve seat disposed ahead of the control piston for defining the regulator chamber between the valve seat and the control piston, and a control valve disposed ahead of the valve seat to be seated on the valve seat or moved away therefrom in response to movement of the control piston and the regulated pressure in the regulator chamber. The valve assembly is adapted to supply the regulated pressure into the power chamber to assist the operation of the manually operated member. An adjusting device is disposed ahead of the control valve for being engaged with a front end of the control valve to urge the control valve to be seated on the valve seat when the regulated pressure exceeds a predetermined pressure. And, a space defined between the adjusting device and the front end of the control valve is communicated with the reservoir.

In the above-described apparatus, the control valve preferably include a valve portion, seated on the valve seat, and a support portion having substantially the same diameter as a diameter of the valve portion, and adapted to receive the regulated pressure. The valve assembly may further comprise a spring disposed ahead of the valve seat for urging the control valve to be seated on the valve seat, and a plunger disposed between the control piston and the control valve for urging the control valve to be moved away from the valve seat in response to forward movement of the control piston.

The adjusting device may comprise a resilient member disposed ahead of the control valve with a clearance defined between a rear end of the resilient member and the front end of the control valve, wherein the regulated pressure is applied to a front end of the resilient member to urge the control valve to be seated on the valve seat when the regulated pressure exceeds the predetermined pressure.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
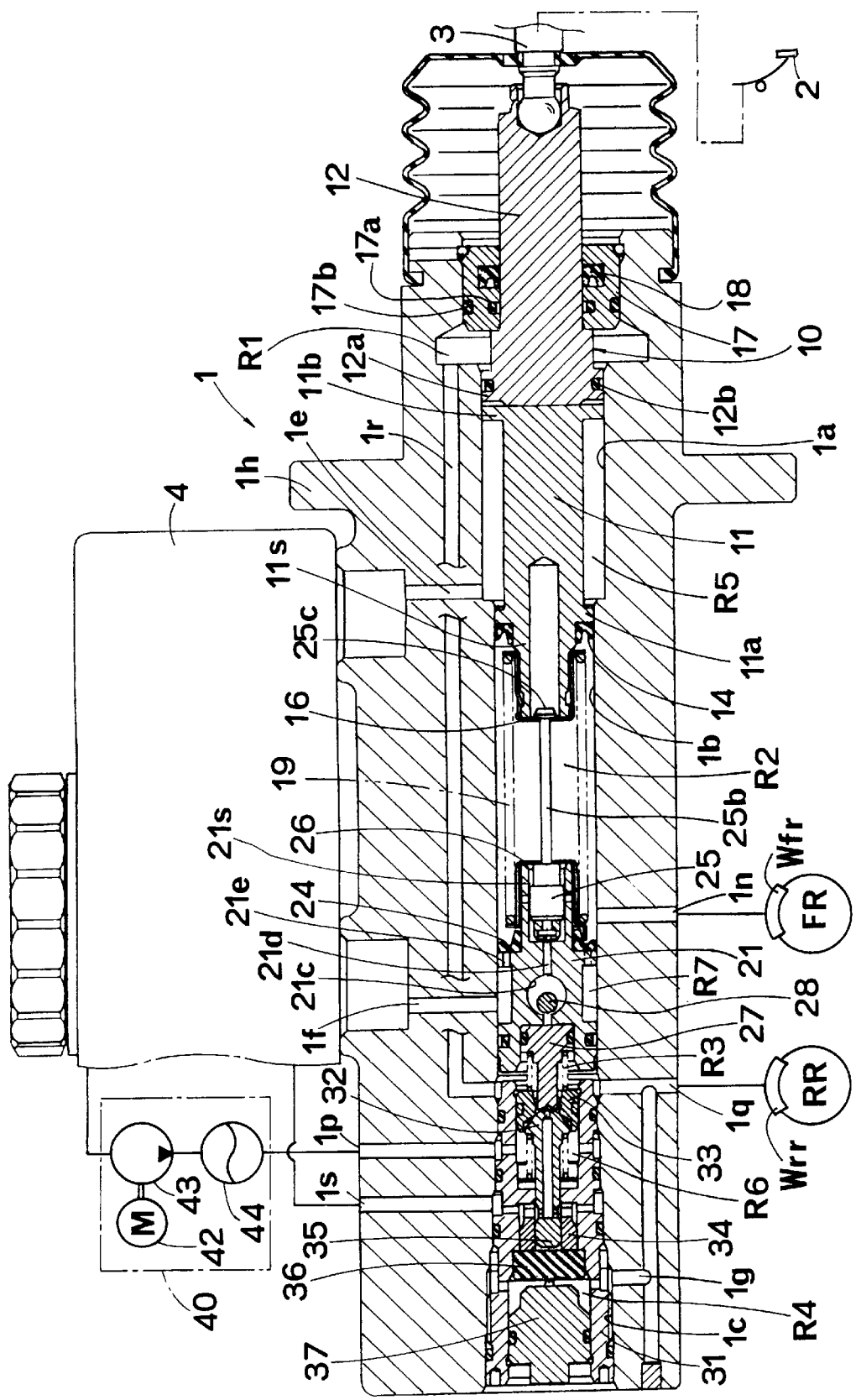
FIG. 1 is a sectional view of a hydraulic brake apparatus for a vehicle according to an embodiment of the present invention.

Referring to FIG. 1, there is illustrated a hydraulic brake apparatus for a vehicle, which includes a cylinder body 1$h$ is provided with a master cylinder section and a regulator section, and which includes a brake pedal 2 which is disposed behind the cylinder body 1$h$ (right in FIG. 1) as a manually-operated member according to the present invention. A depressing force applied on the brake pedal 2 is transmitted as a braking force to the master cylinder section and the regulator section through a push rod 3. In response to this braking force, a hydraulic pressure is generated by the master cylinder section and the regulator section and applied to wheel cylinders Wfr, Wfl, Wrr, Wrl which are operatively mounted on front wheels FR, FL and rear wheels RR, RL of the vehicle. In FIG. 1, there are disclosed only the wheels FR, RR which are located at the front right and rear right of the vehicle, and the wheel cylinders Wfr, Wrr which are operatively mounted on the wheels FR, RR.

In the cylinder body 1h, there is formed a stepped bore which includes bores 1a, 1b, 1c having different diameters from one another, and in which a master cylinder piston 10 and a control piston 21 are received to define therebetween a pressure chamber R2. The bore 1a is communicated with a power chamber R1 having a larger diameter than that of the bore 1a. The control piston 21 is fluid-tightly and slidably received in the bore 1b having the smallest diameter. The master cylinder piston 10 has a first piston 11 and a second piston 12. The opposite ends of the first piston 11 are received in the bore 1b and the bore 1a which is larger in diameter than the bore 1b, respectively. That is, the first piston 11 has a land portion 11a of a relatively small diameter formed around its outer periphery at its front end portion, and a land portion 11b of a relatively large diameter formed at its rear end portion which is away from the land portion 11a by a certain distance. The land portion 11a is provided with an annular cup-like sealing member 14 to be fluid-tightly and slidably received in the bore 1b, while the land portion 11b is slidably received in the bore 1a.

Behind the first piston 11 is disposed the second piston 12 which has a land portion 12a formed around its outer periphery at its front end portion, and which is provided with an annular sealing member 12b to be fluid-tightly and slidably received in the bore 1a. The second piston 12 is so arranged that its front end face contacts with the rear end face of the first piston 11. Therefore, the power chamber R1 is separated by the sealing member 12b from a fluid chamber R5 which is defined in the bore 1a, and communicated with a reservoir 4 for storing brake fluid, through a port 1e. A middle portion of the second piston 12 is supported by a cylindrical sleeve 17. On the inner periphery and outer periphery of the sleeve 17, circumferential grooves are formed to receive therein sealing members 17a, 17b, and on the inner periphery of the sleeve 17 axially remote from the sealing members 17a, 17b, a circumferential groove is formed to receive therein a sealing member 18 thereby to seal the power chamber R1 effectively. The first piston 11 and the second piston 12 may be made in a body.

At the front portion of the cylinder body 1h, there is formed the regulator section which is connected to an auxiliary pressure source 40 for discharging a power pressure therefrom. The auxiliary pressure source 40 includes an electric motor 42 and a fluid pump 43 driven by the motor 42, and its inlet is connected to the reservoir 4 and its outlet is connected to an accumulator 44 through which the power pressure is supplied to a port 1p. The control piston 21 has a pair of land portions formed around its outer periphery with a certain distance apart axially therebetween, and received in the bore 1c to define a fluid chamber R7. As shown in FIG. 1, the control piston 21 has a through hole 21c formed radially, and an axial passage 21d communicated with the through hole 21c. Therefore, one end of the passage 21d is communicated with the fluid chamber R7, while the other end of the passage 21d is communicated with the pressure chamber R2. The fluid chamber R7 is communicated with the reservoir 4 through a port 1f. At the rear land portions of the control piston 21, an axial passage 21e is formed. An annular sealing member 24 is disposed at an end of the passage 21e opening to the pressure chamber R2, so that a one-way valve is formed. Accordingly, the pressure chamber R2 is defined between the sealing member 24 and the sealing member which is disposed on the land portion 11a of the first piston 11.

The control piston 21 has a support portion 21s integral therewith to enclose the passage 21d, and a valve member 25 is slidably received in the support portion 21s. One end of the valve member 25 is covered by a resilient material such as rubber which can abut on the passage 21d to close the same. At the other end of the valve member 25, a rod 25b is formed to be integral therewith, and an engaging portion 25c is formed at an end of the rod 25b. A retainer 26 is mounted on the support portion 21s to restrain the valve member 25 from moving toward the first piston 11. Likewise, the first piston 11 has a cylindrical support portion 11s which is formed near the land portion 11a and extends axially. A retainer 16 is mounted on the support portion 11s to engage with the engaging portion 25c, thereby to restrain the valve member 25 from moving toward the control piston 21. The control piston 21 has a recess formed on its end face opposite to the retainer 26, and a plunger 27 is fitted into the recess. The plunger 27 may be formed to be integral with the control piston 21. The through hole 21c receives therein an engaging pin 28 which is fixed to the cylinder body 1h, so that the control piston 21 is restrained from moving toward the first piston 11.

Figure 2:
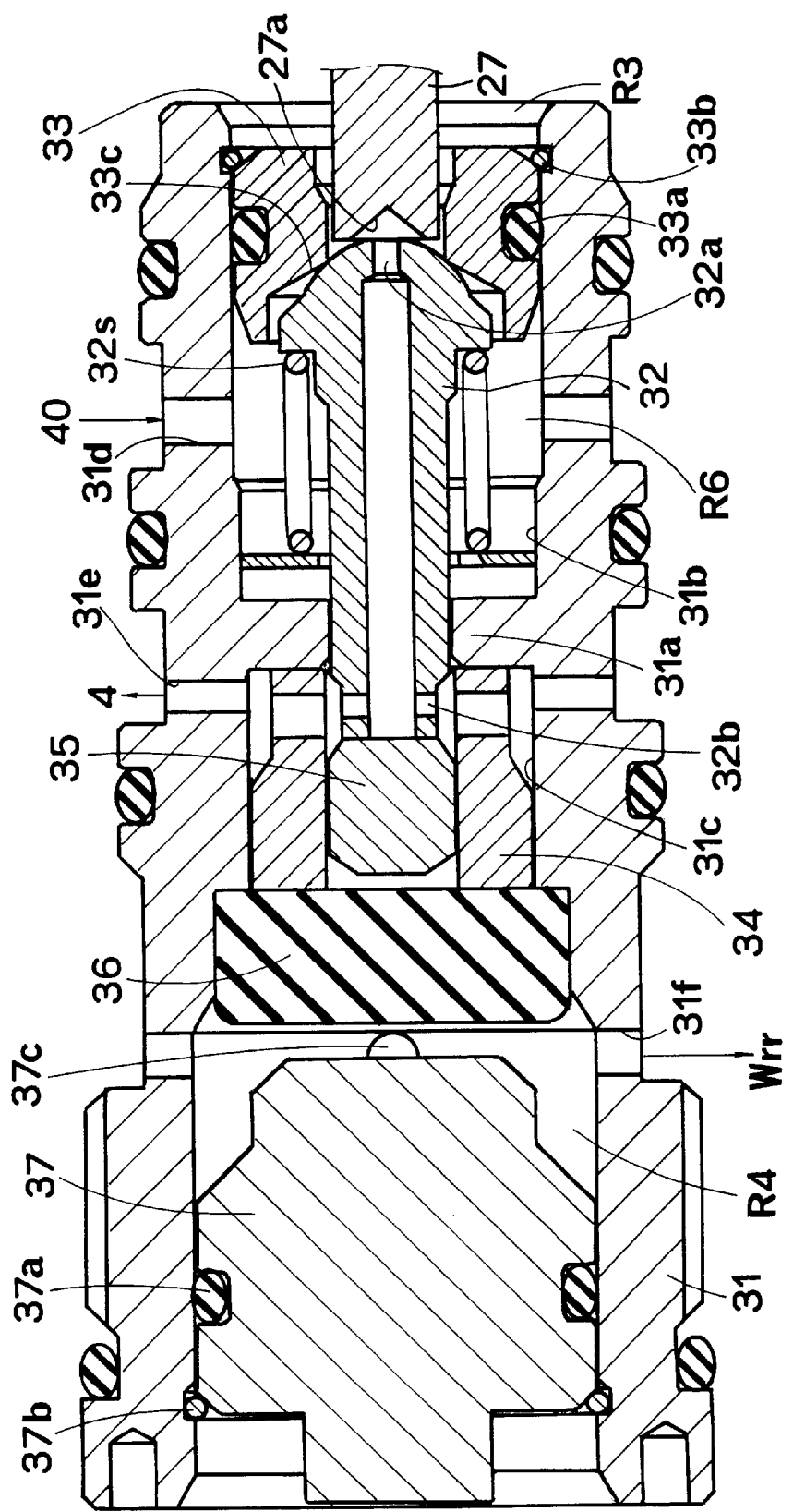
FIG. 2 is an enlarged sectional view of a part of a hydraulic brake apparatus according to an embodiment of the present invention.

A cylindrical sleeve 31 is received in the stepped bore 1c which is communicated with the bore 1b. As shown in FIG. 2, the sleeve 31 has a plurality of circumferential grooves formed around its periphery, and annular sealing members are received in the grooves, respectively. Accordingly, annular ports are defined between the neighboring sealing members to communicate with the inside of the sleeve 31 through radial passages 31d, 31e, 31f which are formed in the sleeve 31. The sleeve 31 has a separation wall 31a at its approximately middle portion, and a control valve 32 is slidably supported in the center of the separation wall 31a. Also, the sleeve 31 has a stepped bore 31b formed at the right of the separation wall 31a in FIG. 1. A valve seat 33 is received in the large-diameter portion of the stepped bore 31b through a sealing member 33a, and fixed and positioned by a snap ring 33b. A seat portion of the control valve 32 is adapted to be seated at its periphery on a seat portion 33c of the valve seat 33. A valve chamber R6 defined in the passage 31d for receiving the control valve 32 is communicated with the auxiliary pressure source 40 through the passage 31d and the port 1p.

The control valve 32 has a columnar support portion whose diameter is the same as the sealing diameter of its valve portion to be seated on the seat portion 33c, and which is slidably supported within a bore defined in the separation wall 31a. Namely, it is so arranged that the support portion and the valve seat portion of the control valve 32 have the same sealing diameter. The control valve 32 has an axial passage 32a for communicating with a regulator chamber R3 of the pressure control chamber, and a radial passage 32b on an axial end portion opposite to the valve seat portion. And, the control valve 32 is biased by a spring 32s so as to be seated on the seat portion 33c. A cylindrical holder 34 is fitted into the minimum diameter portion of a stepped bore 31c which is formed at the opposite ends of the separation wall 31a to the stepped bore 31b. A transmitting member 35 is slidably received in the holder 34, and the control valve 32 is located such that the front end of its support portion abuts on the transmitting member 35. The minimum diameter portion of the stepped bore 31c is communicated with the reservoir 4 through the passage 31e and a port is (as shown in FIG. 1).

A resilient member 36 which is made of rubber for example to form a column is fitted into the intermediate diameter portion of the stepped bore 31c. And, a plug 37 is fitted into the large diameter portion of the stepped bore 31c through a sealing member 37a, and fixed by a snap ring 37b at a predetermined position. The plug 37 has a protrusion 37c which is formed in the middle of an end face facing the resilient member 36, and which is adapted to abut on an end face of the resilient member 36. Then, a pressure chamber R4, which is defined between the resilient member 36 and the plug 37, is arranged to communicate with a port 1q through the passage 31f and a port 1g (FIG. 1). The plunger 27 is located such that its axial end face can abut on the head portion of the control valve 32. The axial end face of the plunger 27 is formed with a conical recess 27a which is arranged to face the open end of the passage 32a formed in the control valve 32. Normally, the axial end face of the plunger 27 does not abut on the head portion of the control valve 32 as shown in FIG. 2, so that a clearance between the recess 27a of the plunger 27 and the head portion of the control valve 32 is formed, and through this clearance the passage 32a can be communicated with the regulator chamber R3.

When the axial end face of the plunger 27 abuts on the head portion of the control valve 32, the communication between the regulator chamber R3 and the passage 32a communicated with the reservoir 4 will be blocked.

Figure 5:
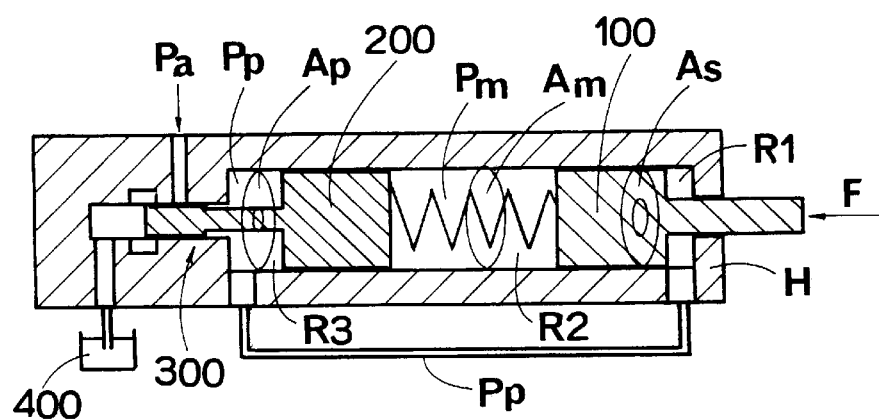
FIG. 5 is a sectional view of a model for clarifying a characteristic according to an embodiment of the present invention.

The hydraulic brake apparatus as structured above has such a servo characteristic as described hereinafter with reference to models illustrated in FIGS. 5 and 6. In a cylinder body H as shown in FIG. 5, a power chamber R1 is defined behind a master piston 100, a pressure chamber R2 is defined between the master piston 100 and the control piston 200, and a regulator chamber R3 is defined in front of the control piston 200, to which a regulator section 300 is connected. A brake pedal input (F) is applied to the master piston 100. In the regulator section 300, the power pressure (Pa) is supplied to increase the pressure therein, or the brake fluid is drained to a reservoir 400 to decrease the pressure, so that the output pressure is regulated to be a regulated pressure (Pp) which is varied in accordance with a certain relationship with a master cylinder pressure (Pm).

The power chamber R1 and the regulator chamber R3 are communicated with each other to provide the same regulated pressure (Pp).

Figure 6:
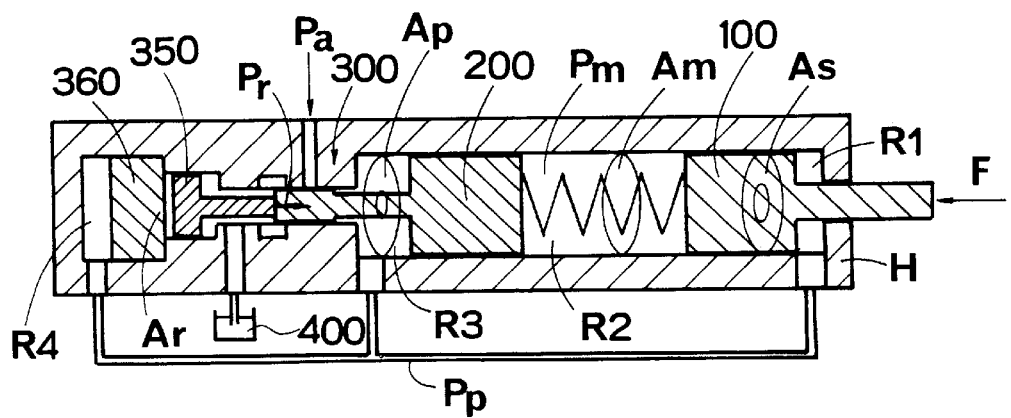
FIG. 6 is a sectional view of another model for clarifying a characteristic according to an embodiment of the present invention.

In FIGS. 5 and 6, "As" corresponds to an area of an annular portion which is obtained by subtracting an area of a portion to which the brake pedal input (F) is applied, from the area of the master piston 100, "Am" corresponds to a sectional area of the pressure chamber R2, and "Ap" corresponds to an area of an annular portion which is obtained by subtracting an area of a portion to which a force is transmitted from the regulator section 300, from the area of the control piston 200. Without such factors as sliding resistance and biasing force of the springs taken into consideration, the relationship of the force applied to each piston will be obtained as follows:

With respect to the master piston 100;

$$Am \cdot Pm = F + As \cdot Pp$$

With respect to the control piston 200;

$$Ap \cdot Pp = Am \cdot Pm$$

As a result, a servo ratio (Pm/F) can be provided only in accordance with the areas of the piston and etc. Therefore, a first servo characteristic including a leading load (a), an initial servo gradient (b), and a jumping amount (c) as shown in FIG. 4 can be provided only in accordance with dimensions of those components.

Figure 4:
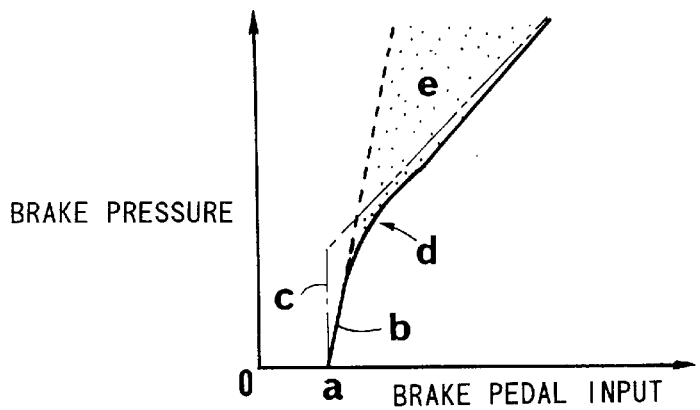
FIG. 4 is a diagram of a characteristic of a model for use in an embodiment of the present invention.

FIG. 6 illustrates a model having a characteristic (d) as shown in FIG. 4 in addition to the characteristic of the model as shown in FIG. 5, and also compensating a dotted region (e) as shown in FIG. 4 to provide a characteristic of a desired gradient as shown by a rigid line in FIG. 4. According to this model, a transmitting member 350 and a resilient member 360 are added in the regulator section 300, and also a reaction chamber R4 is defined so as to apply a pressing force toward the control piston 200 through the resilient member 360. The reaction chamber R4 is communicated with the regulator chamber R3, and a chamber for receiving the transmitting member 350 is communicated with the reservoir 400. According to this model as shown in FIG. 6, the relationship of the force applied to each piston will be obtained as follows:

With respect to the master piston 100, the same equation as that in FIG. 5 can be provided as follows;

$$Am \cdot Pm = F + As \cdot Pp$$

With respect to the control piston 200, however, the reaction force (Pr) is added as follows;

$$Ap \cdot Pp = Am \cdot Pm - Pr$$

The reaction force (Pr) can be provided as follows;

$$Pr = Po + Ar \cdot Pp$$

where "Ar" is a contact area of the resilient member 360 in abutment with the transmitting member 350, and "Po" corresponds to a pressure which deforms the resilient member 360 to fulfill the clearance between the same and the transmitting member 350, and to abut on the transmitting member 350.

Therefore, a second servo characteristic (d) with (e) as shown in FIG. 4 depends upon the pressure (Po) and the contact area (Ar) of the resilient member 360, and it can be varied by changing the configuration of the transmitting member 350 to provide a desired characteristic. Furthermore, the pressure applied to the portion for regulating the pressure in the regulator section 300 can be reduced by the pressure applied to the transmitting member 350.

According to the hydraulic brake apparatus as structured above, when the brake pedal 2 is depressed to push the second piston 12 and the first piston 11 forward (to the left in FIG. 1) through the push rod 3, the valve member 25 abuts on the control piston 21 to shut off the passage 21d by the resilient member of the valve member 25, so that the communication between the pressure chamber R2 and the reservoir 4 is blocked to be in a closed state. Since the master piston 10 and the control piston 21 are held to be in the condition as shown in FIG. 1 through a spring 19, they move together as one member. Then, the plunger 27 fixed to the control piston 21 is forced to push the control valve 32 in the regulator section, so that the axial end face of the plunger 27 abuts on the head portion of the control valve 32 to block the communication between the reservoir 4 and the regulator chamber R3, and the control valve 32 is moved away from the valve seat 33. As a result, the power pressure discharged from the auxiliary pressure source 40 is supplied into the regulator chamber R3 through the port 1p, the passage 31d and the valve chamber R6, thereby to be fed into the wheel cylinder Wrr through the port 1q as a regulated pressure, and into the power chamber R1 through a port 1r. In this case, the movement of the first and second pistons 11, 12 is assisted by the regulated pressure supplied in response to depression of the brake pedal 2, because the sealing diameter of the second piston 12 is larger than the sealing diameter of the first piston 11.

When the second piston 12 and the first piston 11 are assisted in response to depression of the brake pedal 2 to move toward the control piston 21, the pressure chamber R2 is compressed to generate the master cylinder pressure from a port 1n. In this operation, if the regulated pressure becomes greater than the master cylinder pressure, the control piston 21 is actuated to move away from the control valve 32, so that the control valve 32 moves in such a direction that the control valve 32 is seated on the valve seat, thereby to decrease the pressure in the regulator chamber R3. Whereas, if the regulated pressure becomes smaller than the master cylinder pressure, the control valve 32 is pushed by the plunger 27 to move away from the seat portion 33c to increase the pressure in the regulator chamber R3. Thus, the pressure in the regulator chamber R3 is regulated by repetition of the movement of the control piston 21 as described above and the movement of the control valve 32 activated in accordance with the movement of the control piston 21. When the regulated pressure in the regulator chamber R3 is relatively small, the master cylinder pressure is rapidly increased in direct proportion to the input of the brake pedal 2 until the resilient member 36 abuts on the transmitting member 35, thereby to provide a jumping property as indicated by (b) in FIG. 4.

The regulated pressure is introduced into the reaction chamber R4 through the port 1g to deform the resilient member 36. When the resilient member 36 abuts on the transmitting member 35, the control valve 32 is pushed in such a direction that the control valve 32 is seated on the valve seat 33 to prevent the power pressure from being supplied into the regulator chamber R3. In this state, if the head portion of the plunger 27 moves away from the control valve 32, the brake fluid in the regulator chamber R3 is drained into the reservoir 4 through the axial passage 32a and the radial passage 32b of the control valve 32, thereby to decrease the regulated pressure. Consequently, the regulated pressure fed into the reaction chamber R4 through the port 1g is decreased, so that the control valve 32 is actuated to move in such a direction that the control valve 32 is moved away from the valve seat 33 to increase the pressure in the regulator chamber R3. In accordance with the repetition of the above-described movements, the reaction force against the regulated pressure is controlled. Thus, when the regulated pressure is increased, the resilient member 36 is forced to abut on the transmitting member 35, thereby to provide a property as indicated by (d) in FIG. 4. When the regulated pressure is increased to force the resilient member 36 move into the holder 34, the control valve 32 is pushed in such a direction that the control valve 32 is seated on the valve seat 33. Consequently, the increasing ratio of the regulated pressure is made gradual, thereby to enable control of a property in the region as indicated by (e) in FIG. 4.

Figure 3:
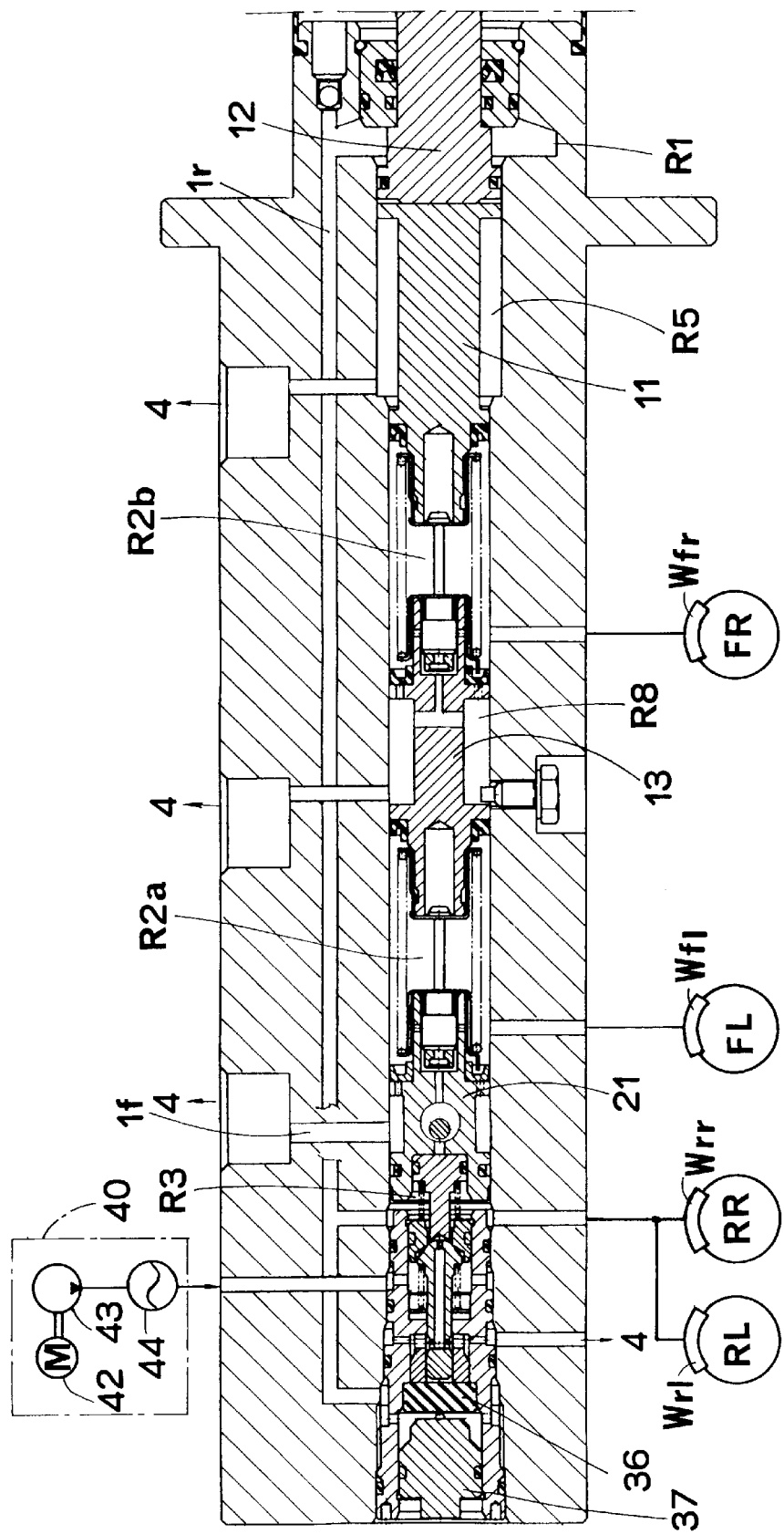
FIG. 3 is a sectional view of a hydraulic brake apparatus for a vehicle according to another embodiment of the present invention.

FIG. 3 illustrates another embodiment of the present invention, wherein the tandem master cylinder is employed, while the regulator and the like are substantially the same as those in the embodiment as shown in FIG. 1. According to the present embodiment, a third piston 13 is disposed between the control piston 21 and the first piston 11, so that a first pressure chamber R2a and a second pressure chamber R2b are formed at the opposite ends of the third piston 13. The third piston 13 has a fluid chamber R8 defined therearound for communicating with the reservoir 4, like a conventional tandem master cylinder. The first pressure chamber R2a is communicated with the wheel cylinder Wfr which is operatively mounted on the front right wheel FR, while the second pressure chamber R2b is communicated with the wheel cylinder Wfl which is operatively mounted on the front left wheel FL, so that the front hydraulic system is provided separately from the rear hydraulic system. The regulator chamber R3 is communicated with the wheel cylinders Wrr, Wrl which are operatively mounted on the rear wheels RR, RL.

It should be apparent to one skilled in the art that the above-described embodiments are merely illustrative of but a few of the many possible specific embodiment of the present invention. Numerous and various other arrangements can be readily devised by those skilled in the art without departing from the spirit and scope of the invention as defined in the following claims.

What is claimed is:

1. A hydraulic brake apparatus for a vehicle comprising:

a master cylinder having a cylinder body and a master piston slidably disposed therein for defining a pressure chamber ahead of said master piston and a power chamber behind said master piston, said master piston being moved forward in response to operation of a manually operated member to pressurize brake fluid stored in a reservoir and generate a brake pressure from said pressure chamber;

a control piston slidably disposed in said cylinder body ahead of said master piston for defining said pressure chamber behind said control piston, said control piston being moved in response to movement of said master piston;

an auxiliary pressure source for pressurizing the brake fluid to generate a power pressure;

valve means having a regulator chamber defined ahead of said control piston and communicated with said auxiliary pressure source for introducing the power pressure into said regulator chamber to regulate the power pressure into a regulated pressure in response to movement of said control piston, said valve means comprising a valve seat disposed ahead of the control piston for defining said regulator chamber between said valve seat and said control piston, and a control valve disposed ahead of said valve seat for being seated oh said valve seat or moved away therefrom in response to movement of said control piston and the regulated pressure in said regulator chamber, said valve means supplying the regulated pressure into said power chamber to assist the operation of said manually operated member; and adjusting means disposed ahead of said control valve for being engaged with a front end of said control valve to urge said control valve to be seated on said valve seat when the regulated pressure exceeds a predetermined pressure, a space defined between said adjusting means and the front end of said control valve being communicated with said reservoir.

2. A hydraulic brake apparatus for a vehicle as recited in claim 1, wherein said control valve includes:

a valve portion seated on said valve seat; and a support portion having substantially the same diameter as a diameter of said valve portion, and adapted to receive the regulated pressure.

3. A hydraulic brake apparatus for a vehicle as recited in claim 2, wherein said valve means further comprises:

a spring disposed ahead of said valve seat for urging said control valve to be seated on said valve seat; and a plunger disposed between said control piston and said control valve for urging said control valve to be moved away from said valve seat in response to forward movement of said control piston.

4. A hydraulic brake apparatus for a vehicle as recited in claim 3, wherein said valve means further comprises a wall member disposed ahead of said valve seat and having a bore for slidably supporting said control piston, said wall member defining a first space between said valve seat and said wall member communicated with said auxiliary pressure source, and a second space ahead of said wall member communicated with said reservoir, and said control valve having a passage for communicating said regulator chamber with said second space.

5. A hydraulic brake apparatus for a vehicle as recited in claim 4, wherein the bore of said wall member has substantially the same diameter as the inner diameter of said valve seat.

6. A hydraulic brake apparatus for a vehicle as recited in claim 1, wherein said adjusting means comprises a resilient member disposed ahead of said control valve with a clearance defined between a rear end of said resilient member and the front end of said control valve, the regulated pressure being applied to a front end of said resilient member to urge said control valve to be seated on said valve seat when the regulated pressure exceeds the predetermined pressure.

7. A hydraulic brake apparatus for a vehicle as recited in claim 6, wherein said adjusting means further comprises a transmitting member disposed between said resilient member and said control valve for defining the clearance between the rear end of said resilient member and said transmitting member.

* * * * *